US008108174B2

(12) United States Patent
Rosenboim et al.

(10) Patent No.: US 8,108,174 B2
(45) Date of Patent: *Jan. 31, 2012

(54) VERSATILE SEMICONDUCTOR MANUFACTURING CONTROLLER WITH STATISTICALLY REPEATABLE RESPONSE TIMES

(75) Inventors: Leonid Rosenboim, Cupertino, CA (US); David Michael Gosch, San Mateo, CA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/619,440

(22) Filed: Nov. 16, 2009

(65) Prior Publication Data

US 2010/0063614 A1    Mar. 11, 2010

Related U.S. Application Data

(63) Continuation of application No. 11/411,005, filed on Apr. 25, 2006, now Pat. No. 7,620,516.

(60) Provisional application No. 60/676,770, filed on May 2, 2005.

(51) Int. Cl.
*G06F 19/00* (2011.01)
*G01R 29/02* (2006.01)

(52) U.S. Cl. .......................... 702/125; 702/79
(58) Field of Classification Search ............ 702/79, 702/81, 83, 84, 119, 123, 125, 127, 176, 702/179, 180, 187; 700/108, 121; 709/213, 709/224–226

See application file for complete search history.

(56) References Cited

U.S. PATENT DOCUMENTS

| | | | | |
|---|---|---|---|---|
| 4,845,615 A * | 7/1989 | Blasciak | .................. | 714/10 |
| 7,062,411 B2 * | 6/2006 | Hopkins et al. | ............... | 702/185 |
| 7,146,237 B2 * | 12/2006 | Lev-Ami et al. | .............. | 700/121 |
| 7,200,671 B1 * | 4/2007 | Lev-Ami et al. | .............. | 709/232 |
| 7,219,255 B2 * | 5/2007 | Khalil et al. | ..................... | 714/4 |
| 7,620,516 B2 * | 11/2009 | Rozenboim et al. | ......... | 702/125 |
| 2003/0037135 A1 * | 2/2003 | Voleti et al. | ................ | 709/224 |
| 2003/0213560 A1 * | 11/2003 | Wang et al. | ............... | 156/345.31 |
| 2004/0040503 A1 * | 3/2004 | Basceri et al. | ............... | 118/715 |
| 2005/0191416 A1 * | 9/2005 | Basceri | ................. | 427/248.1 |
| 2005/0228529 A1 * | 10/2005 | Lev-Ami et al. | ............ | 700/121 |
| 2006/0025871 A1 * | 2/2006 | Khalil et al. | ................. | 700/21 |
| 2006/0094238 A1 * | 5/2006 | Levy et al. | .................. | 438/656 |
| 2007/0008972 A1 * | 1/2007 | Sifnatsch et al. | ............ | 370/392 |

OTHER PUBLICATIONS

International Search Report and Written Opinion of the International Search Authority for PCT/US06/16212, Oct. 23, 2006.*

* cited by examiner

*Primary Examiner* — Michael Nghiem
(74) *Attorney, Agent, or Firm* — Haynes Beffel & Wolfeld LLP; Ernest J. Beffel, Jr.

(57) ABSTRACT

The present invention relates to process I/O controllers for semiconductor manufacturing to which a tool host can delegate data collection, monitoring and control tasks. In particular, it relates to process I/O controllers that can perform more than one of data collection, monitoring, control and response to commands from a tool host with statistically repeatable performance and precision. Embodiments described use prioritized real time operating systems to control of semiconductor manufacturing tools and data collection from tool associated with the sensors. Statistically repeatable responsiveness to selected commands and to sensor inputs during selected recipe steps effectively reduces jitter.

2 Claims, 5 Drawing Sheets

VERSATILE SEMICONDUCTOR MANUFACTURING CONTROLLER WITH STATISTICALLY REPEATABLE RESPONSE TIMES

PRIORITY CLAIMS

This application is a continuation of U.S. Pat. No. 7,620,516 issued on Nov. 17, 2009, from application Ser. No. 11/411,005 filed Apr. 25, 2006, which claims the benefit of U.S. Provisional Patent Application No. 60/676,770, entitled "Versatile Semiconductor Manufacturing Controller with Statistically Repeatable Response Times" by inventors Leonid Rosenboim and David Gosch, filed on May 2, 2005 The priority and provisional applications are hereby incorporated by reference.

RELATED APPLICATIONS

This application is related to the commonly owned U.S. patent application Ser. No. 09/935,213, now U.S. Pat. No. 7,200,671, entitled "Method and Apparatus for Monitoring Host to Tool Communications," by inventors Uzi Lev-Ami and Yossef Ilan Reich, filed 22 Aug. 2001; U.S. patent application Ser. No. 10/819,903, now U.S. Pat. No. 7,146,237, "Controller and Method to Mediate Data Collection from Smart Sensors for Fab Applications" by inventors Uzi Lev-Ami, Guenter Sifnatsch and Mark Attwood, filed 7 Apr. 2004; and U.S. patent application Ser. No. 10/948,085, now U.S. Pat. No. 7,219,255. Those applications are incorporated by reference as if fully set forth herein.

BACKGROUND OF THE INVENTION

The present invention relates to process I/O controllers for semiconductor manufacturing to which a tool host can delegate data collection, monitoring and control tasks. In particular, it relates to process I/O controllers that can perform more than one of data collection, monitoring, control and response to commands from a tool host with statistically repeatable performance and precision. Embodiments described use prioritized real time operating systems to control of semiconductor manufacturing tools and data collection from tool associated with the sensors. Statistically repeatable responsiveness to selected commands and to sensor inputs during selected recipe steps effectively reduces jitter.

Moore's law promises exponential growth in computer power at diminishing prices. This dynamic growth of processing power might lead one to think that semiconductor device manufacturing would be an adventuresome business, like wild-catting for oil. Just the opposite is true. Because manufacturing batches are very valuable and manufacturing processes are sensitive to even small mistakes, semiconductor device manufacturing is a conservative business. Qualification cycles and standards for new equipment and modifications of old equipment are lengthy and demanding. Even a small change is vetted extensively, before being released to production.

Key components used by a fab in semiconductor manufacturing include tools (e.g., deposition chambers, reactors), sensors that monitor the tools (e.g., FTIR sensors, mass spectrographs, thermocouples) and hosts or distributed processors that store and analyze data from the sensors regarding tool operation.

A prior application described a transparent method of listening to data from the sensors and providing it to the hosts or distributed processors using high speed and error-resistant technologies such as TCP/IP over Ethernet. The prior application was by inventors Uzi Lev-Ami and Yossef Ilan Reich, "Method and Apparatus for Monitoring Host to Tool Communications," application Ser. No. 09/935,213, now U.S. Pat. No. 7,200,671 filed on 22 Aug. 2001, which is incorporated by reference. The prior application describes a listening post that could eavesdrop on serial communications from a tool or sensor using an optically isolated connector. Using the eavesdropping approach, one could prove that the fab communications and data collection infrastructure could be upgraded without requiring modification of tools or sensors, at a low risk. The upgrade feasibility could be demonstrated without dismantling the incumbent communications infrastructure.

The next revolution in fab instrumentation and backend analysis capabilities will involve adding intelligent controllers such as process I/O controllers to mediate communications between the tools and sensors, on one side of the process I/O controllers, and tool hosts or distributed processors, on the other side, without needing to replace or change the analytical characteristics of the sensors. Increased processor power and decreased storage cost create opportunities for configurations that would not previously have been practical in a fab environment. A second prior application by inventors Uzi Lev-Ami, Guenter Sifnatsch and Mark Attwood, entitled "Controller and Method to Mediate Data Collection from Smart Sensors for Fab Applications", U.S. patent application Ser. No. 10/819,903 now U.S. Pat. No. 7,146,237, filed on 7 Apr. 2004, describes an intelligent controller with various capabilities. Lacking from the described intelligent controllers is an ability to simultaneously carry out a variety of functions, in cooperation with the tool hosts, while providing statistically repeatable responsiveness. Jitter in the time at which commands are initiated or completed is not well-controlled in current software architectures.

An opportunity arises to change the model of control applied to process chambers by delegating data collection and critical control from the tool host or distributed processor to the process I/O controller. Better, more easily configured and controlled, more resilient components and systems with statistically repeatable responsiveness may result.

SUMMARY OF THE INVENTION

The present invention relates to process I/O controllers for semiconductor manufacturing to which a tool host can delegate data collection, monitoring and control tasks. In particular, it relates to process I/O controllers that can perform more than one of data collection, monitoring, control and response to commands from a tool host with statistically repeatable performance and precision. Embodiments described use prioritized real time operating systems to control of semiconductor manufacturing tools and data collection from tool associated with the sensors. Statistically repeatable responsiveness to selected commands and to sensor inputs during selected recipe steps effectively reduces jitter. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Introduction

Historically, in a fab, host systems ran on main frames, mini computers or work stations. Host systems typically were monolithic, controlling and monitoring all or a substantial set of tools in a fab. Host systems relied on adapters to interface with tools and sensors. Host systems typically received data from the tools and sensors and issued control instructions to the tools. Host systems often received and generated a significant volume of serial communication messages.

The term tool host is used in a broad sense to include both tool control hosts and more limited or flexible distributed processors. Tool hosts include both hosts with comprehensive, integrated tool control functions and hosts that run on distributed processors with more limited, task-specific functions. Tool hosts include products such as Consilium's FAB300™ software, which is described as providing a single comprehensive factory management system driven by a centralized definition of customer-specific business processes. This category of tool hosts is designed to replace traditional manufacturing execution systems, which are designed to control tools provided by different vendors. At the opposite end of the tool host spectrum from traditional manufacturing execution systems, component processes may be run on distributed processors to handle a variety of specific functions, without claiming to be comprehensive management systems. Along the spectrum, a product such as Consilium's FAB300™ software may be considered a tool control host for some purposes and a process running on a distributed processor, for other purposes.

Process I/O Controllers

The approach disclosed herein uses process I/O controllers. The process I/O controller sends and receives signals that control a process chamber or other semi-conductor manufacturing process device, The process I/O controllers communicate data collected from the sensors to data users. The data user may be a traditional tool host running on a mainframe or may be newer software running on distributed processors. The data user may be a monolithic system or confederated packages operating independently or cooperatively. The process I/O controllers also may monitor data from the sensors, identify events of interest, and request further data already collected or change the collection plan for the sensors, responsive to the monitored data.

One Operating Environment

Figure 1:
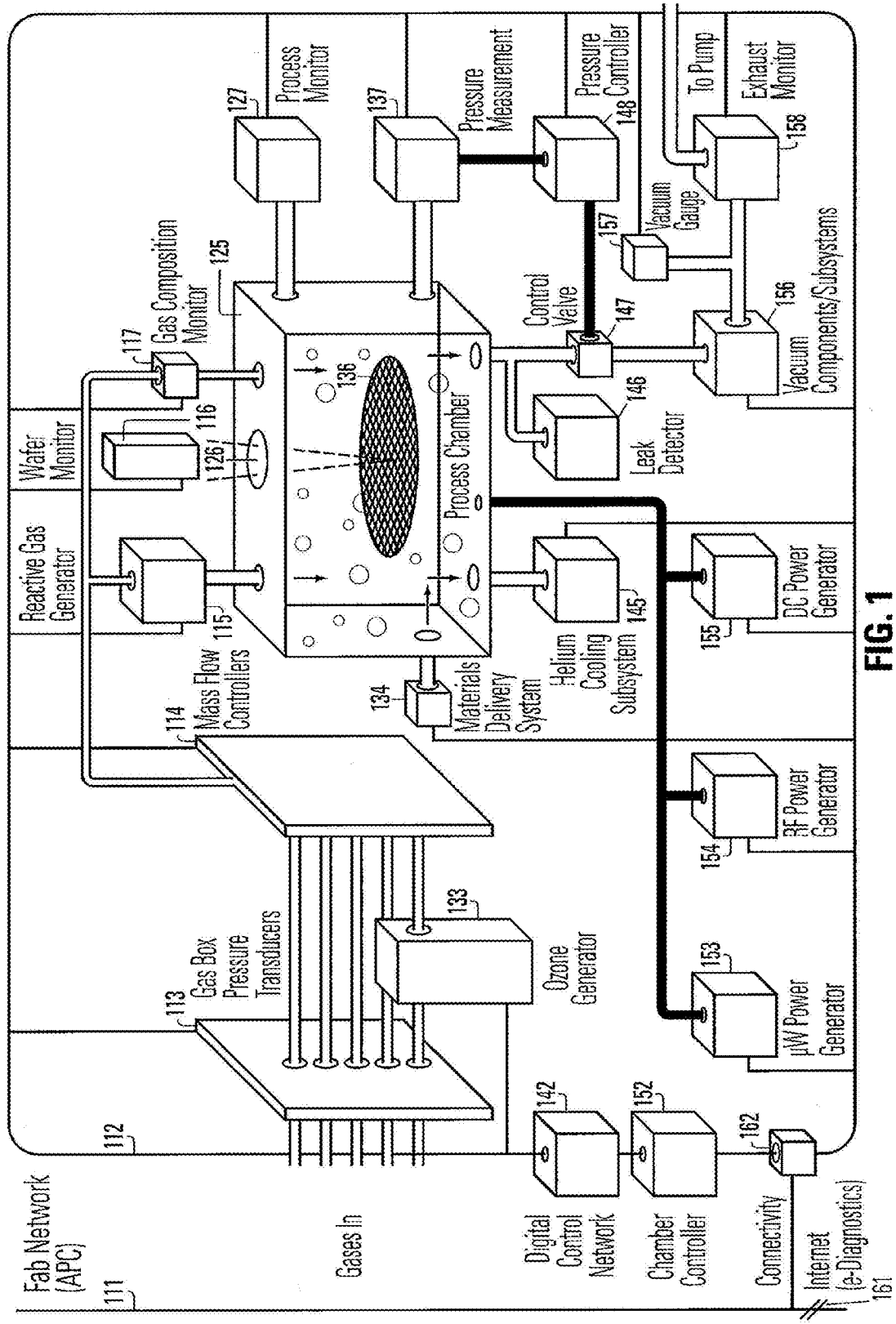
FIG. 1 illustrates an environment in which aspects of the present invention are particularly useful.

FIG. 1 illustrates an environment in which aspects of the present invention are particularly useful. This illustrates a process chamber 125, a variety of inputs to and outputs from the process chamber, plus sensors, control channels and controllers. The chamber 125 may be used for a variety of reactions, such as deposition, cleaning, etching, implantation, ashing, etc. Other types of tools, not illustrated by this figure, also may benefit from aspects of the present invention.

A fab network 111, potentially accessible via the internet, a virtual private network or a wide area network 112, has controlled access through a controller, firewall or other connector 162 to a tool network 112. The tool network in this figure is shown to connect the controls and sensors that impact the process chamber 125 to a ring. Those of skill in the art will understand that this architecture is merely illustrative; serial communications, Ethernet or tiered communications are more likely to be used in a fab than a ring.

Gaseous inputs to the reaction chamber 125 include gases that pass through gas box pressure transducers 113 and mass flow controllers (MFCs) 114. Some gas may pass through an ozone generator 133. Other gases and gas mixtures may pas through a reactive gas generator 115 and a gas composition monitor 117. The reactive gas generator 115 may generate plasma, either inside the process chamber 125 or outside it. The gas composition monitor 117 may be in series with or parallel to the reactive gas generator. The mass flow controllers 114 are in gaseous communication with the reactive gas generator 115 and gas composition monitor 117, and ultimately or directly in gaseous communication with the process chamber 125. The gaseous input devices 113, 114, 133, 115 and 117 are in communication with one or more digital controllers 142, chamber controllers 152 and connectivity points 162. This communication typical includes both control and telemetry. These devices may include both controls and sensors that respond to either the operation of the devices or gaseous input and/or output.

Other inputs may include materials delivery 134, a cooling subsystem 145 and various power injectors 153, 154 and 155. The reaction chamber 125 may be a deposition chamber, etcher, thermal processor or other type of reactor. It may be an automated handling cell, connected to several reactors. Depending on the type of reaction chamber, the materials delivery system 134 may supply, for instance, materials for deposition on a workpiece 136. The cooling subsystem 145 may help regulate the temperature within the chamber 125, as most chemical reactions will proceed at rates that are temperature sensitive. Power supplied to the chamber may include micro-Watt power 153, RF power 154 used to generate plasma, and DC power 155 used to generate plasma and to heat the chamber or gases or other materials supplied to the chamber. The other inputs, like the gaseous inputs, are in communication with one or more digital controllers 142, chamber controllers 152 and connectivity points 162. This communication typical includes both control and telemetry. These devices may include both controls and sensors that respond to either controlling the operation of the devices or sensing their input and/or output.

Sensors may either respond to the chamber conditions or act on exhaust from the chamber. Sensors that respond to chamber conditions may include a wafer monitor 116 that looks through a window 126 into the chamber 125 to look at film thickness, patterns and other properties (e.g., EPI-On-line™), a process monitor 127 such an optical emission monitor with an interference filter or interferometer, for etch process control, and a pressure transducer 137. Sensors that act on exhaust from the chamber 125 include a leak detector 146, a vacuum gauge 157 and an exhaust monitor 158. These sensors may interact with a pressure controller 148 and control valve 147, and with vacuum components and/or subsystems 156. They also may interact with a pump and/or an exhaust gas scrubber, which do not appear in the figure. These sensors are in communication with one or more digital controllers 142, chamber controllers 152 and connectivity points 162. This communication typical includes both control and telemetry. The devices in communication with the sensors, e.g., 147, 148 and 156, may include both controls and sensors.

A desirable characteristic of a monitoring and control system is its determinism, that is, the confidence that every command will be initiated or completed within the specified dead line. Both initiation and completion are considered, because some commands may require a substantial time to complete, such as collecting a sample each 100 milliseconds for five minutes. Determinism will be quantified as the probability that a command is initiated or completed within the specified response time. In order to test determinism, at least one million commands will be exercised, and their actual response times will be collated into a histogram table. It is desired that at least 99% of command's response time fall within the required dead line. Moreover, for a test running continuously for several hours over a dedicated network, on a dedicated test initiator (the computer running the control part), it is desired that the probability of commands to executed within the specified (e.g. 5, 3 or 1 milliseconds) time reach as many "nines" as possible, but at least 99.99%, that is it is allowed that one out of 10,000 commands may be delayed longer than the specified response time, or not executed at all.

Any communications technology has an inherent capacity to corrupt or otherwise fail to deliver digital information to its destination. This is due to several phenomena in both the analogue (electric) and digital domains. As a result, determinism of 100% is an unfeasible ideal, and implementations are evaluated by how close they can come to that ideal. These criteria may be expressed either as so-called "nines" or as three-sigma or five-sigma performance. Sigma refers to a standard deviation, which is a statistical measure.

Figure 2A:
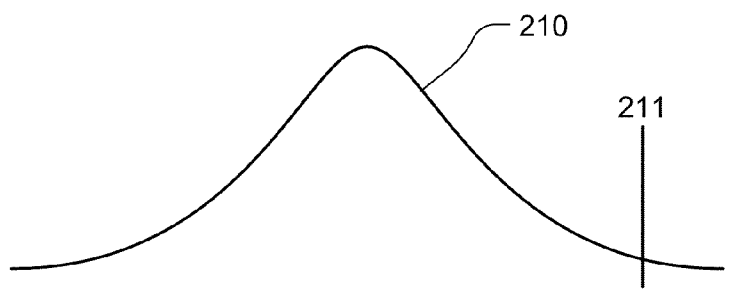
FIGS. 2A-B illustrate performance and variance statistics as distributions.
Figure 2B:
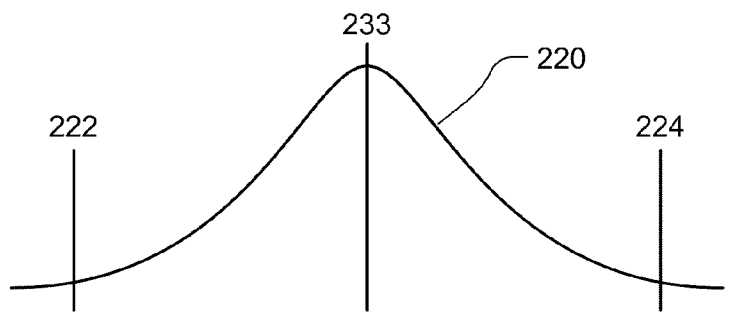

FIGS. 2A-B illustrate performance and variance statistics as distributions. A one-tailed distribution is illustrated by curve 210. A performance criteria, such as three (3σ) or five (5σ) sigma or $\propto=0.01$ (two nines) or $\propto=0.0001$ (four nines) is set, illustrated by the cut-off line 211. A distribution of response times meets the criteria if, for instance, 99% of the actual response times fall to the left of the cut-off line 211. A two-tailed distribution is illustrated by curve 220. A tolerance criteria, such as three (3σ) or five (5σ) sigma or $\propto=0.01$ (two nines) or $\propto=0.0001$ (four nines) is set, illustrated by cut-off lines 222, 224, flanking the target time 223. A distribution of variances from the target time times meets the criteria if, for instance, 99% of the differences between actual and target times fall between the cut-off lines 222, 224. While the illustrated distributions are normal distributions, other distributions including skewed distributions can be measured applying standard statistical or nonparametric criteria. These criteria are applied to stimulus spaced far enough apart that they do not overload the system. For instance, a card cage embodiment of a process I/O controller has been measured to perform within 5 milliseconds, for every I/O command, when such commands are received with at least 20 milliseconds intervals. Limiting factors for this response time were a serial CANbus backplane used in the card cage chassis and other serial protocols used internally in the supported I/O cards. It is anticipated that a custom integrated processing device will perform commands in under 3 milliseconds or under 1 millisecond for every I/O command, without limitation of command frequency.

From experience, it has been determined that jitter can be reduced and performance increased to meet a 5 millisecond criteria, using a card cage chassis. To meet more exacting tolerances, such as 3 milliseconds or 1 millisecond, a more integrated and customized hardware configuration was required, as described below.

Controller Deployment and Architecture

Figure 3:
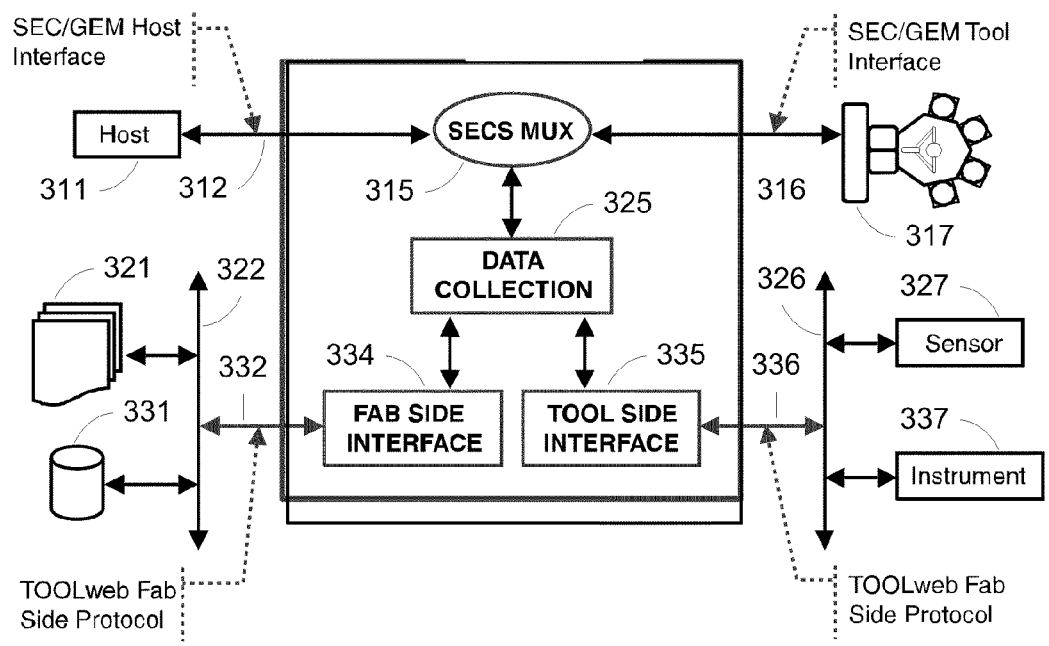
FIG. 3 is a block diagram of a process I/O controller using a single type of communication channel to communicate with a tool, sensor, and tool host.

FIG. 3 is a block diagram of a communication coordinator coupled with tools, sensors, and a tool host or central, master controller. This communication coordinator configuration includes two SEC/GEM interface ports 312, 316 and two network interface ports 332, 336. The controller includes logic and resources to communicate via the SECS protocol, including a SECS MUX 315. It further includes logic and resources implementing a fab side interface 334 for communicating with data users and a tool side interface 335 for communicating with tools, sensors and instruments. The SECS MUX 315 and interfaces 334, 335 are logically connected to data collection and publishing resources 325. On the fab side of the communication coordinator, a traditional tool host 311 may be connected 312 via a SECS compliant communications channel, either SECS-I, HSMS or a subsequent revision of or successor to SECS. In a non-fab environment where this invention might be applied, other protocols could be used to connect with a tool that is being monitored, such as a medical tool or a numerically controlled machine tool. It also may be connected via a fab side protocol distinct from SECS that is carried by a network 322 to storage 331 and reporting 321 resources. On the tool and sensor side of the communication coordinator, a SEC/GEM tool interface 317 to a tool or tool cluster may be connected 316. The controller also may be connected 336 to a network 326 that hosts sensors 327, instruments 337 and other devices, potentially including tools 317. While this figure illustrates the controller being connected via a network to the sensors, it could alternatively use SECS-I or another, serial-based protocol to connect with sensors. Introduced to FIG. 3, a process I/O controller might be introduced to handle both the tool interface 316 and the instrument interface 336. A process I/O controller might be substituted for a communication coordinator.

Figure 4:
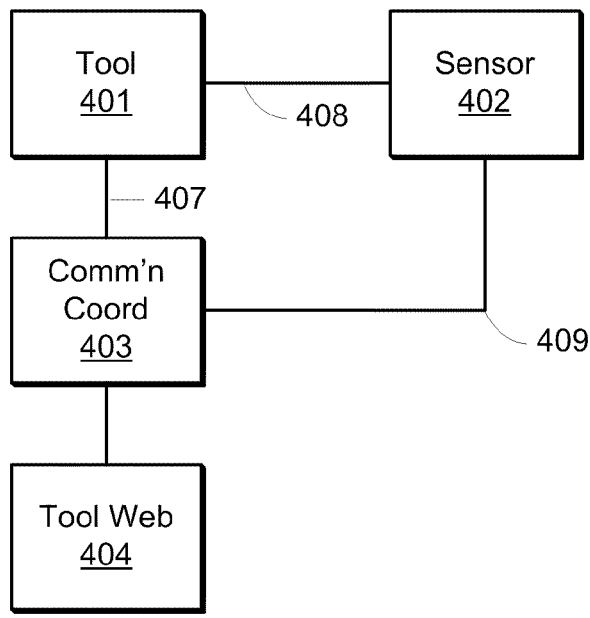
FIG. 4 illustrates using multiple types of communication channels.
Figure 5:
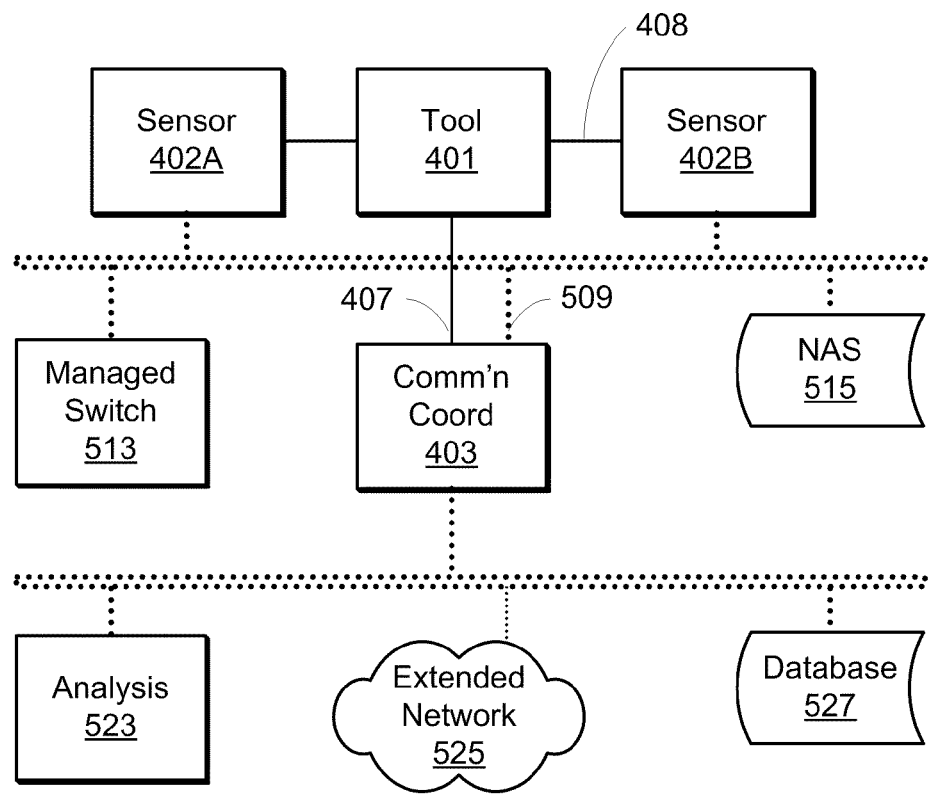
FIG. 5 is a block diagram of software and hardware components that may be used to build a process I/O controller.

FIG. 4 is a block diagram of a communication coordinator using a single type of communication channel to communicate with a tool, sensor, and tool host. FIG. 5 illustrates using multiple types of communication channels. In FIG. 4, a SECS dominated scenario is illustrated. The communication coordinator 403 uses a SECS protocol 407, 409 to communicate with both the tool 401 and the sensor 402. The connection 408 between the tool 401 and sensor 402 may involve any type of energy or force normally sensed, including any of the sensations identified in the discussion of FIG. 1. In FIG. 5, a more complex combination of SECS and network communications are illustrated. The only SECS communications channel 407 in this scenario is between the communication coordinator 403 and host 401. A tool side network 509 connects the communication coordinator with sensors 402A-B, managed switch 513 and network attached storage (NAS) 515. A fab side network 519 connects the communication coordinator 403 with analysis software 523 such as a traditional tool host or distributed processors, with an extended network 525 such as the Internet, a VPN or a dedicated internal network, and a database 527 that persists or stores data published by the communication coordinator. Alternatively, the database 527 could reside on the communication coordinator 403. Alternative physical implementations are described in the following sections. In FIG. 4, a process I/O controller could be introduced between the communication coordinator 403 and the tool and sensor 407, 409, leaving the communication coordinator to handle SECS protocol messages. In FIG. 5, the process I/O controller could be introduced between the communication coordinator 403 and the tool and sensor 401, 402.

Alternatively, eliminating SECS protocol, the managed switch 513 and NAS 515, the process I/O controller could be substituted for the communication coordinator 403.

Card Case Embodiment

The first process I/O controller implementation is based on the 3 U "Euro card" form factor used in previous products. It re-uses existing discrete and analogue I/O cards, which have been modified to use a simplified high performance protocol over CANbus. An additional 3 U card is added, which implements two Ethernet ports (interconnected with a Layer 2 switch fabric), and supports process I/O controller software elements. In one embodiment, it uses proprietary protocol over CANbus to access the actual I/O points. This implementation is modular, and supports up to 16 I/O cards in a single card cage. The system automatically detects which I/O card is installed in every available card slot, and configures all software elements (control and data collection) to reflect the automatically detected configuration.

Figure 6:
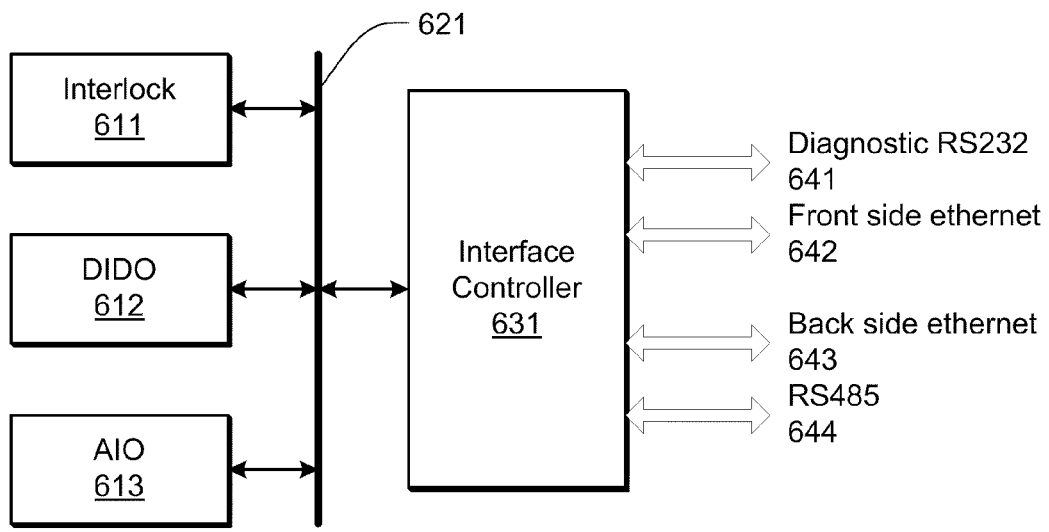
FIG. 6 is a high level block diagram of the process I/O controller physical architecture.

FIG. 6 is a high level block diagram of the process I/O controller physical architecture. In this embodiment, a SCAN bus 621 connects cards in the card cage with the interface controller 631. The interface controller may be a Netcom card with a Motorola Coldfire 32 bit processor, internet connectivity (front side 642 and back side 643), one or more UARTs with software selection between RS232 and RS 485 support, and an internal CAN bus controller, for plug-and-play I/O. The Ethernet connectors may be prioritized, between control functions and other functions. The cards may include an interlock card 611, such as MKS Instruments CDN497-C-E, configured for dual slots, with 36-68 relays and 8-32 DIDO channels. Active interlocks may be indicated by status lights on the interlock card. They may include digital I/O 612 and analog I/O 613 cards, such MKS Instruments CDN491-C-E with 48 in/out points, operating at 24 v with active low signals and MKS Instruments CDN 496-C-E with 32 analog inputs and 16 analog outputs coupled to a 12 bit converter.

This modular design best suits low volume applications. It saves development costs by re-using existing IO cards and requiring only development of custom chassis and distribution panels as per application requirement. On a per-unit price basis, the modular design is more expensive than fully customized monolithic implementations. However, it does not deliver the desired fast response times and narrow tolerances.

Custom, Monolithic Embodiment

Remote I/O units can be more competitively priced when provided in volume, custom versions. The elimination of modularity will significantly reduce hardware component cost. From the card cage embodiment, it was learned that the serial backplane (based on CANbus) has a negative impact on performance. For this reason, all I/O signals can be connected to the processor via a parallel backplane, data bus, for improved performance.

Single Firmware, Multiple Hardware

Elimination of the hardware modularity (cards, slots, connectors) need not eliminate logical modularity. By grouping all I/O into something similar to "logical cards", the main controller firmware can be made to dynamically discover the type and count of I/O signals present in hardware, and perform all software object mapping in accordance with this configuration. This produces a single version of firmware that will be able to run different hardware embodiments. New features and bug fixes can be available on many other logically similar but physically distinct units, reducing costs.

Figure 7:
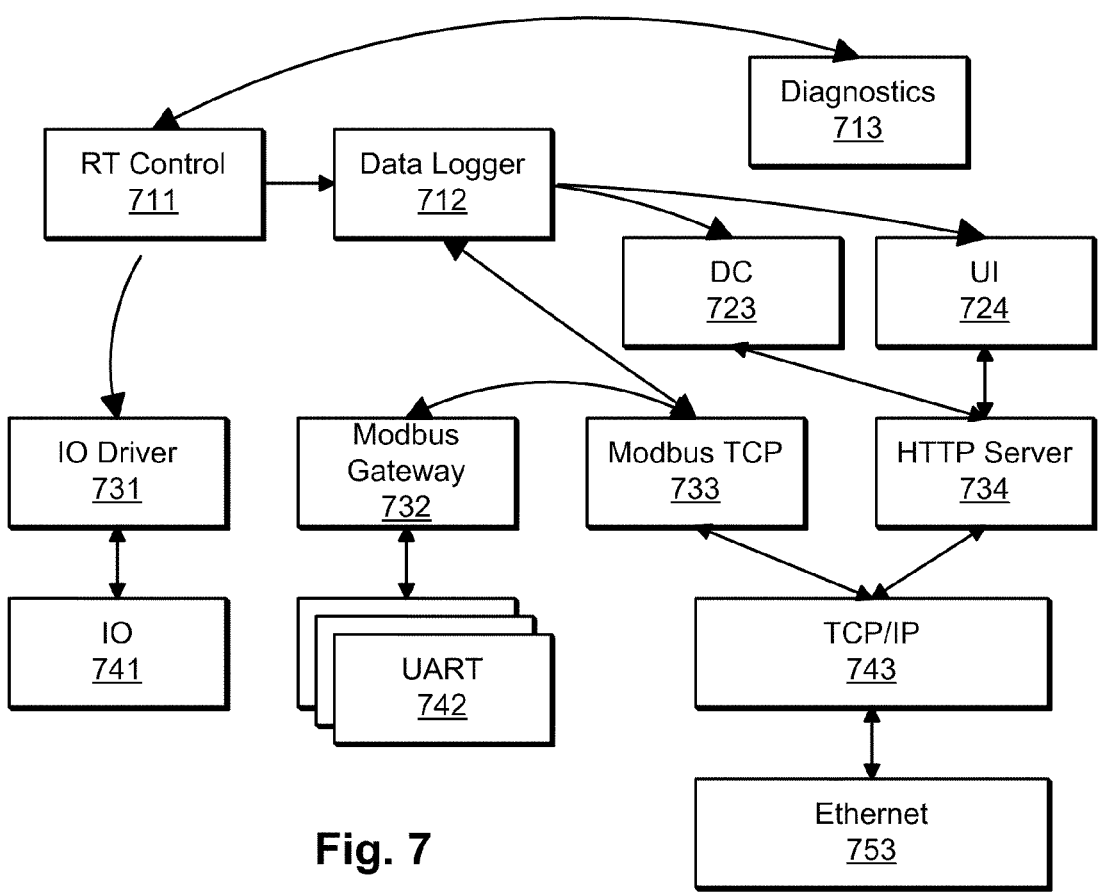
FIG. 7 is a block diagram of I/O and COM architecture with a MODBUS/TCP interface.

FIG. 7 is a block diagram of I/O and COM architecture with a MODBUS/TCP interface. Real time control 711 is coupled with an I/O driver 731 (e.g., via a SCAN bus), with a MODBUS TCP driver 733, a data logger 712 and diagnostics 713.

The I/O driver 731 may be coupled to an I/O channel 741 such as a CAN I/O channel. Tasks depicted in this diagram will be assigned a higher priority for deterministic operation, using a real-time embedded operating system with preemptive priority based scheduling, leaving other tasks at lower priority and along the use of remaining processing resources for the time consuming yet non-critical processing tasks. Tasks 713, 724 and 734 are low priority tasks with heavy processing demands. The data logger is coupled to a data collection 723 and a user interface 724. Both the data collection and user interface are accessible through an HTTP server 734 over TCP/IP 743 and Ethernet 753. The data logger 712 is also coupled to MODBUS TCP 733 resources that may carry message via a gateway 732 and UART 742 or via TCP/IP 743 and Ethernet 753.

Common Characteristics

Both hardware embodiments can provide access to the I/O signals using the de-facto standard MODBUS/TCP. Alternatively, a proprietary implementation of MODBUS over the leaner UDP protocol can be used, where slightly faster response times are required. The choice of MODBUS enables fast and inexpensive integration of process I/O controllers into new as well as existing semiconductor manufacturing process control equipment, because MODBUS specifications are open and freely available. A number of MODBUS implementations are available as reference code for control software integration.

Figure 8:
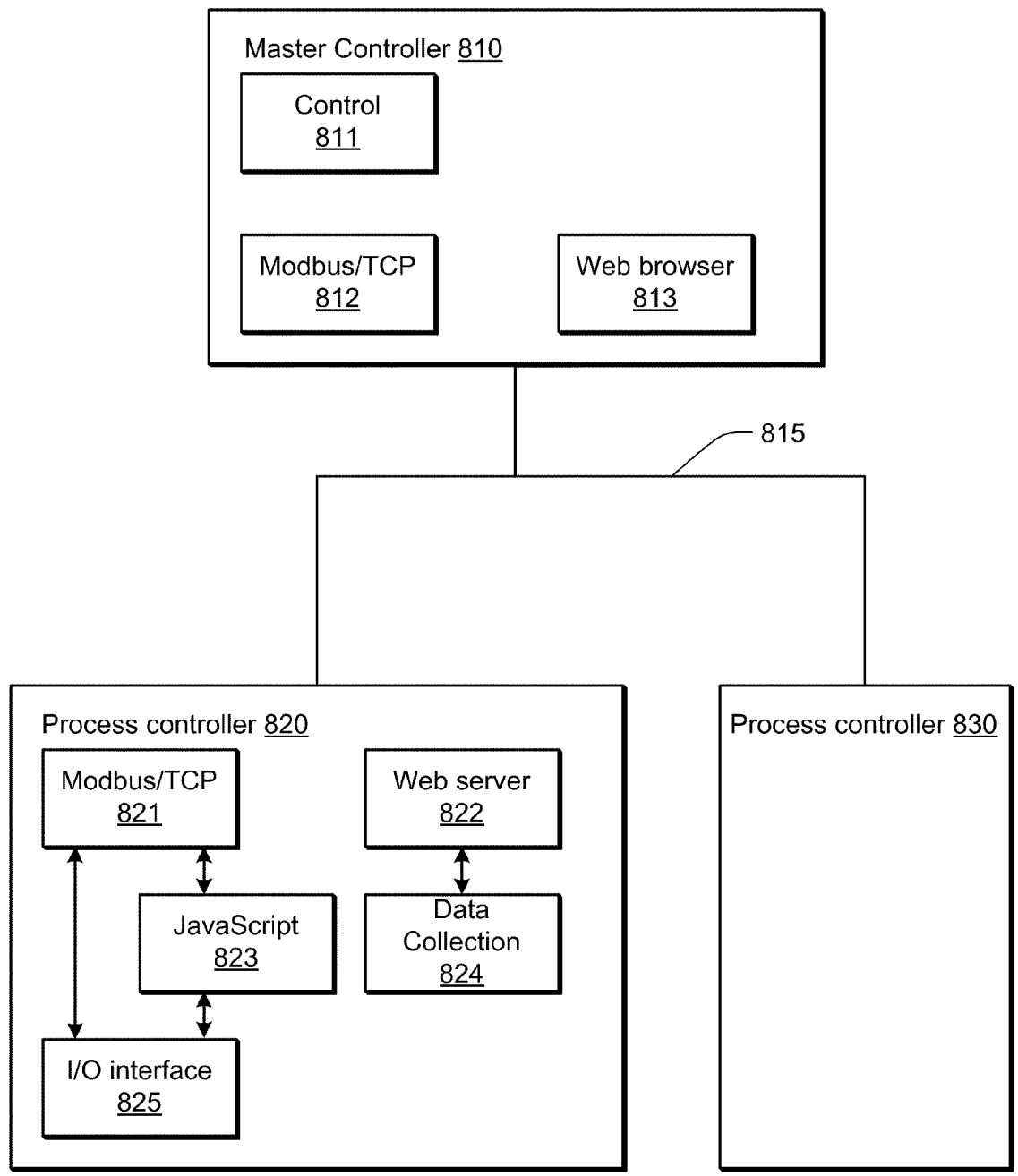
FIG. 8 is a high level block diagram relating process I/O controllers to a tool host.

FIG. 8 is a high level block diagram relating the process I/O controller 820, 830 to the tool host 810. The tool host 810 includes a control program 811, a MODBUS/TCP master application program interface 812 and a web browser 813. The process I/O controller 820 includes a MODBUS/TCP interface 821 and a web server 822. The MODBUS/TCP interface controls loading and execution of JavaScript routines 823 and provides direct access to the I/O interface pins 825. The web server 822 provides access to data collection 824. Additional process I/O controllers 830 have the same capabilities as 820. Communications via Ethernet 815 may connect the tool host to the process I/O controllers or may interconnect the process I/O controllers 820, 830.

The process I/O controller embodiments use an efficient and deterministic embedded real-time software platform to effectively surpass the performance and determinism of the conventional industrial networks, including DeviceNet, thereby reducing the risk involved in migrating control systems. The following are some features offered by these process I/O controller implementations of MODBUS remote I/O control.

At the lowest level, certain application-specific relay circuits or interlocks are designed to prevent the process machine from entering potentially dangerous states. This method has been used traditionally as part of any semiconductor process control application, and is one of the primary factors that require a custom-built process control specific I/O subsystem design. These interlocks protect against logical software errors or any other unforeseen events that might trigger potentially dangerous combinations of gases and/or energy levels. Some process I/O controller embodiment products will include custom or semi-custom relay or interlock circuits, and additional electronics that allow monitoring of these relays via the network connection.

At the second level, the controller I/O devices are internally protected against a failure of its embedded firmware. I/O signals are hardware-controlled by a programmable logic array (e.g., a CPLD), which will turn all discrete outputs off should the process I/O controller firmware fail to provide "heart beat" pulses to the I/O circuit at predetermined time intervals. Similarly, analogue outputs will be reset to 0 Volt level should the firmware appear to fail. These states of outputs, an off state for discrete outputs and 0 Volts for analogue, have been traditionally designated as safe output states in semiconductor process equipment control systems.

At the highest level, a firmware feature that maintains the outputs active and keep a heart beat pulsing for as long as the process I/O controller keeps issuing MODBUS commands at a pre-defined regular frequency. Should the main computer running the process control logic fail, the process I/O controller firmware will immediately turn all outputs to safe state, until the tool host resumes operation. This feature may be potentially disabled in process I/O controller products by means of switching its operational mode to diagnostics. Whenever a diagnostic, or any higher level debug operating mode is selected, a process I/O controller unit will indicate so clearly by slowing yellow or amber status light (instead of the normal green indicator) on its front panel.

Diagnostic Tools

These process I/O controllers present a web interface for a remote I/O unit. A personal computer equipped with an Internet Browser can be used to access the I/O unit user interface directly for a variety of needs. This user web interface is in addition to the normal MODBUS control service provided by the process I/O controller, and is available to be used during development, manufacturing and maintenance of the process equipment. During development, the embedded web user interface allows engineers to build and test their process equipment without having to wait until the application-specific software is fully developed and tested.

The web interface removes the need for the process control software to expose a low-level diagnostic interface and allows technicians to monitor inputs and exercise outputs at the lowest level. Manufacturing testing needs may be satisfied with the web diagnostics interface. The same is probably true for maintenance troubleshooting—no special software or hardware tools are needed; a personal computer can be used to connect to the I/O units via the Ethernet port. Also, the training needs of field personnel will be substantially reduced, as the web interface for diagnostics is extremely intuitive and can be utilized with virtually no special training. Diagnostics however may at times conflict with safety requirements. Therefore, the diagnostics web interface will be reduced to monitor-only mode when the I/O unit is in production mode.

When in production mode, process I/O controller firmware enables a safety watchdog which keeps outputs active only as long as the tool host is active, yet will maintain exclusive control of output state to the tool host or master or central controller, and will also indicate this state by blinking a green status indicator on the front panel. But when the process I/O controller firmware is switched (e.g., by means of a rotary switch) into diagnostic mode, the safety watchdog will be defeated, thereby removing the requirement for a tool host, and will allow control of outputs by means of the web user interface, and indicate this state with a blinking amber status light.

Dual Personality—Remote I/O and Data Collection

Part of the process I/O controller product architecture is the support for the MKS Instruments TOOLweb™ framework for data collection and analysis for the purpose of process fault detection and advanced process control. TOOLweb's success uses high-quality data that can be collected for as many process variables as possible. The process I/O controller's implementation of a data collection agent, combined with the TOOLweb ToolSide protocol, makes virtually all of its I/O signals available for collection at a high frequency.

Therefore, process I/O controllers embodying the features described create an opportunity for TOOLweb data gathering and comprehensive analysis of the underlying processes.

Experience has proven that current process control software data collection implementations often lack the quality and throughput needed by sophisticated mathematical modeling methodology. Current control software is intended to primarily control the process, so anything that is not an essential to control tends to be lower on the implementers' priority list, and, if implemented, is typically insufficient.

Sampling

Sensors that monitor semiconductor manufacturing processes are used for controlling the process, and to maintain certain critical process parameters within assigned tolerances. In addition, it is becoming increasingly popular to collect, store and analyze data for defect analysis, after a wafer is completed. Readings from sensors connected to the processing chamber are collected and stored for offline analysis, which aims to correlate various data sources in order to discover the root causes of process failures, or to predict preventive maintenance required on the process equipment. Sensors typically include various gas pressure sensors, temperature transducers, mass flow controllers, RF and DC power sources and energy transmission instruments, and so forth.

The collected data should be of quality that enables subsequent mathematical or statistical analysis. Measuring instruments should produce accurate digital readouts of the underlying physical quantities. Measurement samples should be taken at intervals that are significantly smaller than any expected rate of change of process quantities, so that the rate of change or any other anomaly in the rate or pattern of change can be easily depicted by any analytical method employed. Samples should be taken at specified and statistically repeatable intervals.

The instant in time when an instrument takes each measurement should be recorded with the value, or at least the sample number from which the sample time can be derived. This time stamp of collected data can be as important as its value, especially if there is jitter in the timing of samples. The recorded or derived fuse should be at least as accurate as the measurement is, otherwise, it would not be practicable to compute derivatives of variables. Derivatives of physical measurements reflect the rate of change or "slope" of a given measurement, and can play a key role in detecting various process anomalies, or effectively forecasting the need for preventive maintenance. For example, gradual decline of dd temperature derivative, during chamber warm-up phase, where the said temperature slope is positive, is indicative of gradual fatigue of the heating source, and any significant abrupt drop in this amount is a sure sign that one of the heating sources used has failed. Cool down, where temperature derivative is negative, a decline of this amount versus previous runs may suggest that the cool down process was too rapid, which may increase the crystalline structure stress in the processed materials, i.e. silicon wafers.

Separation of Control from Data Acquisition

Sensors and material delivery controllers that are being developed with advanced data collection in mind, where resource usage is strictly prioritized such that control takes precedence to data collection, without negative impact on the quality of data collected. This involves a real-time operating system with preemptive scheduling which is responsible for assuring statistically repeatable response to control commands and measurement queries, while leaving data collection tasks and reporting to use the remaining resources.

It may be beneficial to use different protocols for control and data collection, because of the requirements of these two activities. While control puts emphasis on deterministic response time and efficiency, data collection favors low complexity and ease of integration with IT systems and databases. Use of different protocols also distinguishes software elements amplifying the two activities. In some cases it is appropriate to even use separate hardware interfaces for each of these activities, for example, use a DeviceNet or an analogue interface for control, and an IT friendly Ethernet port with TCP/IP and HTTP Web technologies for data collection. In other circumstances it could be quite appropriate to run MODBUS/TCP for control over the same Ethernet port that is also used for HTTP/XML data collection protocol.

Collection Timing Decoupling and Batched Transmission

One data collection approach is for the sensors must to be equipped to ensure precise timing of data collection. A "data collection plan" is introduced to the sensor's firmware. A data collection client will thus need to define a collection plan, which will trigger a lightweight data collection daemon to begin sampling data at precise intervals, augmenting data samples with time stamps, and storing the sample in a circular buffer of a predetermined size.

Thereafter, the data collection client will make periodic requests, as resource priorities permit, to retrieve the buffered samples pertaining to the particular collection plan, and typically to receive all samples recorded since the last data transfer. The intervals for data retrieval requests do not need to be precise or deterministic, as long as requests are made at intervals that avoid circular buffer overflow. As data is accompanied with a time stamp, any latency of data retrieval has no impact on the quality of collected data. If the buffers are large enough to retain several seconds of samples, it can be practically guaranteed that no data will be lost, unless there is a catastrophic failure of the data collection client or the underlying network infrastructure. In the definition of a collection plan, the data collection client defines which measurements will be collected, when, and how often. A sensor with sufficient resources can accommodate multiple data clients and collection plans.

Data samples optionally are augmented with a sequence number. A data collection client uses the sequence numbers to avoid recording duplicate data samples and to detect lost data samples. Sequence numbers also support a stateless implementation of a data collection server, allowing the data collection client to keep track of the sequence number of the last data sample retrieved, and request data beginning with the next sequence number. Stateless server implementation is known to be efficient in the use of both memory and CPU resources, reducing the resources requirements for a sensor to save data.

Retrieval of the sensor buffer of data samples can essentially be batched, so that client data requests services multiple data samples, up to the maximum number of samples in the buffer. This spreads the overhead associated in a data retrieval request over multiple data samples, making the data collection process more bandwidth-efficient, and reducing the average overhead incurred.

Sensor Protocol Implementation

There are several sensors and material delivery products in various development stages that implement sample buffering. They use an XML-based data model, delivered on stateless client-server implementation of HTTP. The sensor implementing the server. The embedded HTTP server provides a user interface directly to the instrument for configuration and diagnostics. A repertoire of XML-based commands and responses allow a data collection client to automatically discover these sensors on a network, retrieve a complete list of measurements (i.e. variables) available for collection, define application-specific collection plans, and retrieve buffered data samples.

Some of these sensors use a separate interface for control, which in some cases uses a separate physical DeviceNet connection, while others share the same Ethernet port with MODBUS/TCP protocol. It has been demonstrated that HTTP data collection and user interaction do not cause failure of statistically repeatable performance or timing.

Prioritization

In order to implement both personalities of a process I/O controller—the hard real-time transaction oriented networked I/O control and time-elastic publishing of collected data—these sensors feature an advanced real-time software foundation. Upon this foundation both applications are built with strict attention to resource utilization, and conscious prioritization of resource allocation, such that data collection activity within the allowed performance parameters does not degrade MODBUS control command performance. Also, the collected data publishing is implemented such that with the expected MODBUS activity volume, ample bandwidth remains available to publish collected data without loss of either quantity or quality.

In addition to prioritization, the total number of variables samples and the collection frequency are limited so that the data collection activity when combined with MODBUS will not overrun available resources, cause collection data loss or cause unpredictable system behavior.

Logical vs. Physical Data

For control purposes, the process I/O controller allows low-level access to its I/O by connector pin numbers, and values are represented in simple binary form. A tool host is expected to perform its own mapping of connector pin numbers to variables, while CONTROLweb does not perform any translation so as to preserve the raw values and maximize performance.

For analysis, on the other hand, data elements should have logical meaning—variable names should represent actual parameters, and analogue values should be scaled and offset into physical units of measurement. Values should be compensated for sensor calibration, so that values collected by sensors from similar process chambers will be comparable.

To add symbolic representation of connector pins, these process I/O controllers implement a variable mapping table, which is configurable and stored in non-volatile memory, which assigns logical names and numerical adjustments to the I/O signals of interest. Note that for some process I/O controllers, the I/O pin count exceeds the number of symbolic variables in the mapping table. If only mapped I/O pins are accessible, the mapping table also identifies the I/O signals of interest for data collection and analysis.

Process I/O controllers are configured for the sensors and controls attached to I/O pins. The variables of interest are identified, named, and when needed a numerical scaling offsets are applied so that the value reported is more meaningful, preferably in standard units of measurement. Since the data collected is symbolically named, its meaning is recognizable even when taken off-line or off-site where few details of a given tool set-up and instrumentation are available. Collected values may retain their meaning over time, even when the actual tool is upgraded or updated.

When configuring process I/O controllers installed on similar tools, configuration is simplified by the ability to download a configuration into a text file and uploading the text file into other process I/O controllers. These configuration files can be edited off-line using standard PC software tools, so that configurations may be prepared by process specialists off-site.

Remote I/O Intelligence, Scripting

The initial goal of card chassis controller architecture was to squeeze the fastest possible response time with MODBUS over Ethernet, and to improve the repeatable precision of controls beyond precision achievable with slower industrial buses, such as DeviceNet. We learned that in many cases, the bottleneck for process precision timing lies in the tool host or master controller itself and the operating system used to implant the tool host. Some existing master controllers operate within 50 millisecond tolerances, others within 100 millisecond tolerances.

In practice, these control systems are quite complex and frequently developed by large design teams over long periods of time. The development tools used have been available only on general purpose computing platforms. The complexity of these legacy software systems contributes significantly to their imprecision.

To improve process precision without dedicating a workstation to each process tool, these process I/O controllers implement a limited yet powerful programming environment to control remote I/O. This programming environment is not intended to displace the conventional process control software systems, but rather to augment them by delegating those parts of process control logic that have critical timing requirements to the real-time based process I/O control units, which remain under control of the tool host or master controller.

The software or operators identify small yet critical process steps, and translate the required monitoring and feedback into small programs that can be executed within the resource-limited, deterministic real-time operating environment with timing precision such as better than 5 milliseconds, better than 3 milliseconds or better than 1 millisecond precision.

Language, Programming Tools

The process I/O controller local programming supports a subset of the ECMA standard JavaScript language, which is an Object Oriented Event Driven interpreted programming language. A program is downloaded into an I/O unit in plain text, and can be thereafter invoked using specially assigned program state registers, that can be set and monitored via MODBUS. This program state register is also used for the tool host to monitor execution and completion of the said program. One processor family suitable for implementing this environment is the Motorola ColdFire family of reduced instruction set computing (RISC) microprocessors. One of the microprocessors in this family is designated MCF 5282Because these processors derive from the venerable 68000 processor series, many development tools and a variety of real time operating systems are available. A block diagram and details of this processor family are accessible at www.freescale.com.

A limited number of script programs should be executed at any given time, and these programs should be limited in size. Size limitations are introduced and certain language tools or features have been removed from this implementation so that to minimize the risk that a user-written script will overrun available computing resources, and cause undefined behavior of the control subsystem. Still, it may be possible through programming error to partially disrupt certain parts of a process I/O controller that have been assigned a priority lower than that of the script interpreter. Features at risk include the web user interface, data collection and adjacent script interpreters, which run other concurrent scripts. It is therefore recommended to keep these user scripts programs short and simple, avoid tight loops, and use event notifications wherever possible.

A special web page will display the recent script execution history. This web page provides more details than the program status register that is available via MODBUS.

A hierarchy of classes is built into the script interpreter to represent local I/O signals on the process I/O controller, so that the script may exercise control over outputs and monitor inputs. Also, discrete inputs can generate events, which can be assigned to specific script functions, and invoked asynchronously when these inputs change values or state.

Virtual I/O, Script Control & Monitoring

Script interpreters are assigned a special 16 bit register that can be read and written via MODBUS that controls and monitors the status of the corresponding script interpreter. A master or central controller may write this register to start or abort execution of a script, or read this register to monitor the interpreter status: i.e. if the script is running, or has normally terminated, or has been terminated abnormally, in the later case this register will contain the script exit code.

The above mentioned program control register is further generalized, and a limited number of additional registers are pre-defined for each script interpreter. These additional registers, like the program status register, are accessible for read and write via MODBUS, and also can be accessed by the script running on the appropriate interpreter. These registers can be used for a variety of purposes that involve communications between the script running on CONTROLweb and the master controller.

Remote I/O, Distributed Scripting

In addition to full and unimpeded access to local I/O signals, the script interpreter is augmented with a class hierarchy that can be set up to represent I/O signals physically connected to other process I/O controllers, but after being associated would behave almost like a local I/O signal, with the same basic access methods and attributes. I/O signals residing on other process I/O controllers (remote I/O operations) typically respond more slowly, and cannot be used as sources for asynchronous events.

This remote I/O on other process I/O controllers is implemented by augmenting the script interpreter with a MODBUS client (master) implementation, which provides access to I/O signals on other process I/O controllers connected to the same network.

This convenient facility should be used with care, considering the above mentioned limitations. One of the best uses is synchronizing scripts running on different process I/O controllers concurrently, which combine to perform a single process sequence, where the I/O count and/or process physical layout are such that connecting all related I/O signals to the same process I/O controller is impractical.

Process Recipe Delegation

A fabrication process details are typically termed "a recipe", which is in fact a program that governs the details, including sequences, timing and thresholds of a chemical or section process. In some prior processors, a recipe is downloaded to a chamber process control computer (or a previously stored recipe is selected) by the factory control host. This recipe is subsequently executed by the master controller for every single wafer in a lot. The aim of a master controller is to repeat this recipe as precisely as possible for every single wafer in a given lot, or for any other lot, so that the process result (e.g. thickness of a deposition layer) would come out the same every single time. But as was earlier mentioned, current process control systems that are based on general purpose computing platforms with large and complex software systems, which have recognizable limitations with respect to timing precision, and limited capability to quickly respond to a change of an input, and react quickly enough. These limitations ultimately set a cap on the level of precision that recipes can be repeated, and is a serious factor limiting the current process equipment yield and throughput. As a result, certain processes are intentionally slowed down so that they can be stopped in time.

The solution to this issue proposed with these improved process I/O controllers, is to effectively delegate those parts of a recipe which are deemed critical, to the real-time based remote I/O devices.

The main process controller, instead of iteratively processing the recipe instructions one at a time (as is now the norm), would first sort through a recipe, and define those parts that require timing or response precision above what the main controller itself is capable. These critical recipe steps would then be compiled into Scripts, and loaded into the appropriate process I/O controller for later execution. Then, the process I/O controller would iteratively execute the recipe: perform the parts that where not marked as "critical" using it's own resources, and at the points where a "critical step" is reached, would initiate a script to execute on one of the Remote I/O units, and monitor the script execution through one or more Virtual I/O variables, that are being used by the script to indicate its status.

During the phase of compilation, the master controller will substitute all references to logical values and states to physical or mapped I/O signal references, and will otherwise convert the recipe step into a script program. One way to accomplish this is with the use of script templates, where a pre-existing script is written for a certain recipe step type and the master controller will then need to insert actual I/O references and specific timing and threshold values in to predefined script locations.

Some Particular Embodiments

The present invention may be practiced as a method or device adapted to practice the method. The same method can be viewed from the perspective of a tool host, a slave or process I/O controller, and operating protocol or a system. The invention may be an article of manufacture such as media impressed with logic to carry out the method(s).

One embodiment is a method of precisely timed control over semiconductor manufacturing processes. This method uses a tool host and a process I/O controller. The process I/O controller includes electrical interfaces to process chamber monitors and controls and supports precisely timed input and output through the electrical interfaces. The tool host includes a programming environment that symbolically represents electrical interfaces. This method includes, at the tool host, preparing a control program that includes instructions for the process I/O controller to sample inputs and control outputs through the electrical interfaces. From the tool host, the control program is loaded onto the process I/O controller. At the process I/O controller, upon receiving a command invoking the control program, the control program is run to generate statistically accurate timing of sampling inputs and controlling outputs through the electrical interfaces. Sampling inputs and controlling outputs is considered to have statistically accurate timing when variances in a 99.99% range of distribution of variances between a target time in actual times are less than or equal to five milliseconds. In some instances, a target time may be as soon as possible and performance of a command may be within less than or equal to five milliseconds. In other instances, the target time may be as soon as an input reaches a particular level.

One aspect of this method is that the control program may be prepared in an interpretive programming language, such as JavaScript. Use of an interpretative programming language facilitates loading a control program without disrupting priorities of executing commands or other programs. Another aspect, which may be combined with the first, is that loading of the control program proceeds with a load processing priority that preserves priority of processing commands by the process I/O controller, whether received from other process I/O controllers or the tool host. A yet further aspect involves loading the control program without taking the process I/O controller off-line from at least some sampling of inputs and controlling of outputs through the electrical interfaces.

In at least one embodiment, the sampling inputs and controlling outputs may be performed with a 99.99% range of distribution of variances between a target time in actual times that is less than or equal to three milliseconds. The monolithic controller embodiment described can provide precise timing of sampling inputs and controlling outputs, such that a 99.99% range of distribution of variances between a target time and actual times is less than or equal to one millisecond.

In operation, this method may include the process I/O controller setting the tool host virtual digital signals corresponding to the sampled inputs and the changing outputs through the electrical interfaces. The process I/O controller sends these virtual digital signals without disrupting the statistical accuracy of timing of the sampling and controlling. The virtual digital signals may include timestamps. The tool host, responsive to the virtual digital signals, may send the process I/O controller a command causing the process I/O controller to stop running the control program.

The process I/O controller may, responsive to the control program, send control commands to another process I/O controller with statistically accurate timing. The tool host may be configured to accept timing tolerances for control steps in a recipe and determine whether or not delegate the timing of those control steps to the process I/O controller. When it is determined to delegate the timing of the control steps, a control program is prepared and loaded into the process I/O controller.

Another embodiment is a method of controlling a process running in a process chamber at a repeatable interval using a process I/O controller cooperating with the central controller. This method includes, at the process I/O controller that monitors and controls one or more aspects of the operating chamber, receiving control commands from the central controller and processing the control commands within the first statistically repeatable short interval of five milliseconds for less after the receiving. A short interval is considered statistically repeatable when times in a 99.99% range of distribution of times are less than or equal to the short interval. The process I/O controller, without failing statistical repeatability in the processing of control commands, also samples one or more sensors coupled to the process chamber and offers the samples within a statistically repeatable tolerance of a sampling schedule. A tolerance is considered statistically repeatable when variances and 99.99% range of distribution of variance between a target time and actual times are less than or equal to the tolerance. Depending on the hardware embodiment, the first statistically repeatable short interval may be 3 ms or less or 1 ms or less. Again depending on the hardware embodiment, the statistically repeatable tolerance may be five milliseconds, three milliseconds or one millisecond or less.

Practicing the method described above, buffering samples may include buffering timestamps corresponding to the samples. The process I/O controller may distribute at least some of the buffered samples without failing in statistical repeatability of the processing of control commands or failing in statistical repeatability of the sampling. Alternatively, the method further may include, without failing repeatability of the processing of the control commands or in failing statistical repeatability of the sampling, executing dynamically loadable instructions from memory of the process I/O controller. These instructions may include responding to selected results of the sampling, the responding happening within a second statistically repeatable short interval that is less than a statistically repeatable feedback interval required to report the sampling to the central controller and receive back a responsive command. Alternatively, the second statistically repeatable short interval may be less than half as long as the first statistically repeatable short interval.

The method further may include the process I/O controller receiving, recognizing and dynamically loading instructions into memory of the process I/O controller, without taking the process I/O controller off-line from monitoring and controlling aspects of operating the process chamber. Alternatively or in combination, the method for them may include the process I/O controller distributing at least some of the buffered samples without failing in statistical repeatability of the receiving and processing of control commands or failing in statistical repeatability of the sampling or failing in statistical repeatability of the executing dynamically in loaded instructions.

Another aspect of the method may be, without failing in statistical repeatability of the receiving and processing control commands or failing in statistical repeatability of the sampling, the process I/O controller executing dynamically loaded instructions from memory. In particular, these instructions may include initiating closed loop control of at least one aspect of operating the process chamber, the initiating happening within a second statistically repeatable short interval that is less than a feedback interval or less than half as long as the first statistically repeatable short interval. In some instances, the second short interval may be less than one-fifth as long as the first statistically repeatable short interval. The method may include the process I/O controller receiving, recognizing and dynamically loading instructions into memory the process I/O controller, without taking the process I/O controller off-line from monitoring and controlling aspects of the process chamber. The process I/O controller may distribute at least some of the buffered samples without failing in statistical repeatability.

As a device, a process I/O controller may include port adapted to communicate with the central processor, memory, and logic and resources coupled to the port and the memory, adapted to carry out the methods and any of their aspects that are described above.

While the present invention is disclosed by reference to the preferred embodiments and examples detailed above, it is understood that these examples are intended in an illustrative rather than in a limiting sense.

We claim as follows:

1. A method of precisely timed control over semiconductor manufacturing processes using a tool host and a process I/O controller, wherein the process I/O controller includes electrical interfaces to process chamber monitors and controls and supports precisely timed input and output through the electrical interfaces, and the tool host includes a programming environment that symbolically represents the electrical interfaces, the method including:
using the tool host, preparing a control program that includes instructions for the process I/O controller to sample inputs and control outputs through the electrical interfaces;
from the tool host to the process I/O controller, loading the control program; and
using the process I/O controller, upon receiving a command via a transmission protocol, invoking the control program, running the control program to generate statistically accurate timing of sampling inputs and controlling outputs through the electrical interfaces;
wherein the sampling inputs and controlling outputs is considered to have statistically accurate timing when variances in a 99.99 percent range of distribution of variances between a target time and actual times are less than or equal to 5 (five) milliseconds.

2. A process I/O controller including:
a port adapted to communicate with the central processor;
memory;
logic and resources coupled to the port and the memory, adapted to receive control commands via a transmission protocol from the central controller and processing the control commands within a first statistically repeatable short interval of 5 milliseconds or less after the receiving;
wherein a short interval is considered statistically repeatable when times in a 99.99 percent range of distribution of the times are less than or equal to the short interval;
and adapted, without failing statistical repeatability in the processing of the control commands, to sample one or more sensors coupled to the process chamber and buffering the samples within a statistically repeatable tolerance of a sampling schedule; and
wherein a tolerance is considered statistically repeatable when variances in a 99.99 percent range of distribution of variance between a target time and actual times are less than or equal to the tolerance.

* * * * *